US009212629B2

(12) United States Patent
Hu et al.

(10) Patent No.: US 9,212,629 B2
(45) Date of Patent: Dec. 15, 2015

(54) EQUIPMENT AND METHOD FOR CONTROLLING AIR SYSTEM OF DIESEL ENGINE

(75) Inventors: Guangdi Hu, Shandong (CN); Shaojun Sun, Shandong (CN); Dehui Tong, Shandong (CN); Xiaolin Zhang, Shandong (CN)

(73) Assignee: Weichai Power Co., Ltd., Weifang (CN)

( * ) Notice: Subject to any disclaimer, the term of this patent is extended or adjusted under 35 U.S.C. 154(b) by 319 days.

(21) Appl. No.: 13/984,450

(22) PCT Filed: Jan. 27, 2011

(86) PCT No.: PCT/CN2011/070696
§ 371 (c)(1),
(2), (4) Date: Aug. 8, 2013

(87) PCT Pub. No.: WO2012/100421
PCT Pub. Date: Aug. 2, 2012

(65) Prior Publication Data
US 2014/0000573 A1      Jan. 2, 2014

(51) Int. Cl.
*F02M 25/07*       (2006.01)
*F02D 41/00*       (2006.01)
(Continued)

(52) U.S. Cl.
CPC ......... *F02M 25/0704* (2013.01); *F02D 41/005* (2013.01); *F02D 41/0007* (2013.01);
(Continued)

(58) Field of Classification Search
CPC .................. F02M 25/0756; F02M 2025/0761; F02D 41/0072

USPC ............. 123/568.11, 568.16, 568.19, 568.21, 123/568.24, 568.26; 701/101, 108
See application file for complete search history.

(56) References Cited

U.S. PATENT DOCUMENTS

| 6,729,303 B2 | 5/2004 | Itoyama et al. |
| 7,062,910 B2 | 6/2006 | Inoue |

(Continued)

FOREIGN PATENT DOCUMENTS

| CN | 1366579 A | 8/2002 |
| CN | 1644900 A | 7/2005 |
| CN | 101809274 A | 8/2010 |

OTHER PUBLICATIONS

PCT International Search Report and Written Opinion (with English translation), PCT/CN2011/070696, Oct. 27, 2011, 18 Pages.

*Primary Examiner* — John Kwon
(74) *Attorney, Agent, or Firm* — Fenwick & West LLP (57) ABSTRACT

An equipment (200) for controlling an air system of a diesel engine, comprises an operation condition acquiring device (202), an objective flow determining device (204) and a signal generating device (206). The operation condition acquiring device (202) is used to acquire actual operation condition parameters of the diesel engine. The objective flow determining device (204) is used to determine objective flow parameters on the basis of the actual operation condition parameters from the operation condition acquiring device (202), through a non-linear physical model which characterizes the air system. The signal generating device (206) is used to generate signals for controlling an EGR system and a turbocharge system on the basis of the objective flow parameters from the objective flow determining device (204). A method for controlling an air system of a diesel engine and a computer program medium recording the computer program code for performing the method are also disclosed.

20 Claims, 4 Drawing Sheets

(51) Int. Cl.
  *F02D 41/14*    (2006.01)
  *F02B 3/06*     (2006.01)
  *F02B 29/04*    (2006.01)

(52) U.S. Cl.
  CPC ....... *F02M25/0707* (2013.01); *F02M 25/0713* (2013.01); *F02B 3/06* (2013.01); *F02B 29/0406* (2013.01); *F02D 2041/1433* (2013.01); *F02D 2200/0402* (2013.01); *F02M 25/0727* (2013.01); *Y02T 10/144* (2013.01); *Y02T 10/47* (2013.01)

(56) References Cited

U.S. PATENT DOCUMENTS

| | | | |
|---|---|---|---|
| 7,934,492 B2 | 5/2011 | Gerum | |
| 2002/0170546 A1* | 11/2002 | Itoyama | 123/568.27 |
| 2002/0173898 A1* | 11/2002 | Itoyama et al. | 701/104 |
| 2005/0155348 A1 | 7/2005 | Inoue | |
| 2005/0204731 A1* | 9/2005 | Nakano et al. | 60/295 |
| 2008/0167791 A1* | 7/2008 | Fulton et al. | 701/108 |
| 2009/0293458 A1* | 12/2009 | Kim | 60/286 |
| 2010/0175671 A1 | 7/2010 | Gerum | |

\* cited by examiner

EQUIPMENT AND METHOD FOR CONTROLLING AIR SYSTEM OF DIESEL ENGINE

FIELD OF INVENTION

Embodiments of the present invention generally relate to a diesel engine, and more specifically, relate to an equipment and method for controlling an air system of a diesel engine.

BACKGROUND OF INVENTION

As the continuous development of engine theory and technology, exhaust gas recirculation (EGR) system has become an important part of a diesel engine. Exhaust gas emitted from a diesel engine generally contains a great amount of nitrogen oxides (NOx), which is a major source for air pollution. With the EGR system, a part of exhaust gas generated by the diesel engine is fed back to cylinders. Since the recirculated exhaust gas is inertial, it will delay the combustion process, decelerate the combustion speed somewhat, further slow down the pressure formation process in the combustion chamber, thereby effectively reducing the nitrogen oxides. Besides, increase of the exhaust gas recirculation ratio will reduce the overall exhaust gas flow, thereby reducing the total pollutants output volume in the exhaust gas emission.

In a diesel engine equipped with the EGR system, the matching relation between exhaust gas recirculation ratio (EGR rate) and fresh air entering into the engine during transient process is key to the transient process emission of the air system of the diesel engine. Therefore, many diesel engines employ a turbocharge system to accelerate the response of the air system during transient process. Besides, the turbocharge system may enhance the power performance of the diesel engine and improve combustion, and is one of important components in modern diesel engines. For example, a variable geometry turbocharger (VGT) is a common turbocharge system. The turbocharge system is essentially an air compression system, in which air intake volume increases in the diesel engine cylinders through compressing air. It is driven by the impact force from the exhaust gas emitted from the engine. The pressure is transmitted to an air compressor through devices such as a turbocharger rotary shaft, such that the newly intake air is effectively supercharged before entering into the cylinders.

In a diesel engine equipped with both the EGR and the turbocharge system, the coupling characteristic therebetween poses a challenge to the control of air system. In the diesel engine equipped with both the exhaust gas recirculation system EGR and the turbocharge system, for the EGR system, precise control of the EGR rate and intake air temperature is crucial to improve NOx emission and reduce its impact on particles, power, and cost-effectiveness. In such an engine, the flow of the exhaust gas input in an EGR cooler is controlled by an EGR valve. Both the inlet end of the EGR valve and the turbo outlet of the turbocharger receive the engine exhaust gas emitted from the exhaust pipes. It is appreciated that besides the opening variation of the EGR valve per se, the change of the supercharge pressure and exhaust back pressure caused by the turbocharge system will also cause an impact on the EGR flow. On the other hand, the opening variation of the EGR valve will also cause an impact on the inlet flow of the input supercharger. In other words, the exhaust gas recirculation system and the turbocharge system are two mutually dependent and mutually influencing systems, i.e., having a coupling characteristic. In particular, in an air system control of the diesel engine, the match between EGR rate and fresh air during transient process is key during the transient emission process.

The coupling characteristic of the exhaust gas recirculation system and the turbocharge system has always been a challenge for air system control of a diesel engine, and a multi-variable control strategy controlling both has also been a hot issue in studying air system control strategy of the diesel engine. Several known control strategies in prior art are briefly summarized below:

(1) an independent control strategy for exhaust gas recirculation system and the turbocharge system, i.e., with the supercharge pressure as control objective, driving the VGT valve by a PID (proportion-integration differentiation) control with transient feed-forward control strategy so that actual supercharge pressure reaches an objective value; with air flow as control objective, driving the EGR valve by PID control with transient feed-forward control strategy so that the actual air flow reaches an objective value.

(2) With intake air flow and supercharge pressure as control objectives, performing local linearization to average value model of air system, designing an optimal or robust controller based on the linear model, further extending to entire operation condition scope, thereby obtaining a non-linear control strategy: e.g., H infinity control, a controller design method based on Lyapunov stability theory, minimum quadratic model optimal state feedback control law, sliding mode controller, and the like.

(3) With intake air flow and supercharge pressure as control objectives, a controller design method based on a non-analytic model: e.g., fuzzy logic control method, control method according to neural network, etc.

(4) With intake air flow and supercharge pressure as control objectives, a method of employing model prediction control, i.e., a mathematic model of a controlled object being integrated in the controller, a future output of a multi-step system being predicted through the model, an objective function being built based on the offset between the predicted value and the objective value, and the objective function being minimized by iteratively evaluating the optimal value of current control variables.

(5) With air-fuel ratio and mass fraction of exhaust gas within the intake pipe as control objectives, adopting the air system de-ranking and de-coupling control strategy, i.e., the transmission function matrix of the air system is de-ranking in some cases; thus, the two control objectives have such a relationship that the original two-dimensional control strategy may be converted into a simpler one-dimensional control strategy.

The above mentioned major advantages of the independent PID control strategy (1) based on air flow and supercharge pressure lie in a simpler structure, the capability of implementing a good steady-state control effect, and less experimental workload for parameter calibration. The challenge of the independent closed-loop PID control lies in that the coupling characteristic of the system per se causes dissatisfactory control effect in its dynamic process, and smoking phenomenon likely appears during acceleration process. Another drawback of independently working closed-loop control lies in the limited EGR working scope. Because the EGR valve is only capable of working when the pressure before turbo is higher than the supercharge pressure, it is only applicable to medium-low load and medium-low rotational speed operation. Companies such as Nissan, Toyota, Cummmins do not employ air flow and supercharge pressure as the objective values during practical use, instead, they adopt a control strategy with the EGR rate instead of supercharge pressure as the objective value.

A common problem with the above mentioned methods is EGR flow estimation. Since EGR flow sensor is far away from meeting the requirement of actual use in terms of precision and reliability, the EGR flow is mainly obtained by estimation. However, exhaust pipes temperature and pressure, the EGR pipe throttling coefficient, and cooling efficiency and the like that place an impact on EGR flow all require a considerable amount of testing in order to obtain a satisfactory estimation result. Therefore, the control system according to this method requires enormous work for testing. Although the above mentioned control strategies are able to achieve a sound effect in a steady state control, their transient control effects are always unsatisfying since the exhaust gas recirculation system and the supercharge system simultaneously act on the intake pipe thus having a coupling characteristic, and those control strategies fail to design a transient control strategy for the coupling characteristic.

There is an apparent contradiction between precision requirement and concise requirement of the air system control strategy for control strategies (2)-(4) with intake air flow and supercharge pressure as control objectives. This contradiction is directly caused by the strong coupling and non-linear correlation between the exhaust gas recirculation system and the supercharge system. The independent closed-loop control strategies based on air flow and supercharge pressure, as well as its variations, cannot meet the requirements of steady state and transient performance. Various theoretical study outcomes are not adaptable for the requirements of an actual control system due to various factors such as complexity of control strategies, requirements of control hardware, and difficulties in parameter calibration, etc.

As far the control strategy (5) with the air-fuel ratio and the mass fraction of exhaust gas in the intake pipe as control objectives, due to lack of mature commercial sensor that directly measures the air-fuel ratio and the mass fraction of exhaust gas in the intake pipe during actual use, the feedback control with the parameters as control objectives cannot be realized. However, the air flow and supercharge pressure can be very easily measured by existing sensors. Therefore, a feedback strategy based on air flow and supercharge pressure may be built, and air-fuel ratio and exhaust gas mass fraction in the intake pipe both as intermediate variables may be obtained through an observer. However, the state observer would introduce time delay and error, which are disadvantageous to transient operation control.

In view of above, the control strategies for air system in a diesel engine in prior art can not well meet the performance requirements of steady state and transient operation at the same time during actual working of the diesel engine or the requirement of the exhaust and calibrating diesel engine control unit (ECU).

Therefore, it is desirable in this field for an air system control strategy that can satisfy the actual working condition of a diesel engine, and is relatively simple and easily implemented and calibrated.

SUMMARY OF INVENTION

In order to overcome the above mentioned drawbacks existing in prior art, embodiments of the present invention provide an apparatus and method for controlling an air system of a diesel engine.

According to one aspect of the present invention, there is provided an apparatus for controlling an air system of a diesel engine, the air system comprising an exhaust gas recirculation EGR system and a turbocharge system, wherein the EGR system comprises an EGR valve, and the turbocharge system comprises an air compressor and a supercharge valve, the apparatus comprising an operation condition acquiring device configured to acquire a measurement value of cylinder exhaust pressure of the diesel engine and a measurement value of air flow through the air compressor; an objective flow determining device coupled to the operation condition acquiring device and configured to determine an objective exhaust gas flow through the EGR valve and an objective exhaust gas flow through the supercharge valve, based on an objective value of the cylinder exhaust pressure of the diesel engine and an objective value of the air flow through the air compressor, according to the measurement values acquired by the operation condition acquiring device, using a non-linear physical model characterizing the air system; and a signal generating device coupled to the objective flow determining device and configured to generate a first drive signal for the EGR system and a second drive signal for the turbocharge system based on the objective exhaust gas flow through the EGR valve and the objective exhaust gas flow through the supercharge valve as determined by the objective flow determining device.

In one embodiment of the present invention, the objective flow determining device further comprises: a sliding control based determining module configured to determine the objective exhaust gas flow through the EGR valve and the objective exhaust gas flow through the supercharge valve based on a sliding control strategy.

In one embodiment of the present invention, the signal generating device further comprises: an EGR valve objective opening determining module configured to determine an objective opening of the EGR valve based on the objective exhaust gas flow through the EGR valve; and a supercharge valve objective opening determining module configured to determine an objective opening of the supercharge valve based on the objective exhaust gas flow through the supercharge valve.

In one embodiment of the present invention, the first drive signal is for controlling the opening of the EGR valve, and the second drive signal is for controlling the opening of the supercharge valve.

In one embodiment of the present invention, the apparatus is implemented using a system-on-chip SOC or an integrated circuit IC.

In one embodiment of the present invention, the non-linear physical model is correlated with the following aspects of the diesel engine: intake pressure, exhaust pressure, air flow, gas flow entering into cylinder, cylinder exhaust valve outlet flow, intake valve flow coefficient, rotary speed, cylinder displacement, intake thermal constant, intake temperature, intake pipe equivalent volume, exhaust thermal constant, exhaust temperature, exhaust pipe equivalent volume, supercharger mechanical efficiency of the EGR system, supercharger turbo efficiency, supercharger turbo thermal capacity, atmosphere ambient temperature, atmosphere ambient pressure, intake air thermal capacity ratio, exhaust gas thermal capacity ratio, compressor efficiency, moment of inertia of supercharger rotary shaft, supercharger rotary speed, supercharger turbo exhaust energy, supercharger compressed air energy, compressed air thermal capacity, and fuel ejection flow. In one embodiment of the present invention, the non-linear physical model is further correlated with a dynamic interference source of the air system of the diesel engine.

According to another aspect of the present invention, there is provided a diesel engine, comprising: a cylinder; an intake pipe coupled to an inlet end of the cylinder and configured to convey gas to the cylinder; an exhaust pipe coupled to an outlet end of the cylinder and configured to exhaust gas from combustion in the cylinder; a fuel ejection system coupled to the cylinder and configured to eject fuel to the cylinder; an air system; and a control unit comprising the above mentioned apparatus for controlling the air system. The air system comprises: an exhaust gas recirculation EGR system coupled to the exhaust pipe and the intake pipe and comprising the EGR valve, the EGR system being configured to convey part of exhaust gas from the exhaust pipe back to the cylinder through the intake pipe; a turbocharge system coupled to the exhaust pipe and comprising an air compressor and a supercharge valve, the turbocharge system being configured to supercharge intake pressure through the cylinder using the exhaust gas from the exhaust pipe.

According to another aspect of the present invention, there is provided a method for controlling an air system of a diesel engine, the air system comprising an exhaust gas recirculation EGR system and a turbocharge system, wherein the EGR system comprises an EGR valve, and the turbocharge system comprises an air compressor and a supercharge valve. This method comprises: acquiring a measurement value of cylinder exhaust pressure of the diesel engine and a measurement value of air flow through the air compressor; determining an objective exhaust gas flow though the EGR valve and an objective exhaust gas flow through the supercharge valve based on an objective value of the cylinder exhaust pressure of the diesel engine and an objective value of the air flow through the air compressor according to the acquired measurement values, using a non-linear physical model characterizing the air system; and generating a first drive signal for the EGR system and a second drive signal for the turbocharge system based on the objective exhaust gas flow through the EGR valve and the objective exhaust gas flow through the supercharge valve.

In one embodiment of the present invention, the determining further comprises: determining the objective exhaust gas flow through the EGR valve and the objective exhaust gas flow through the supercharge valve based on a sliding control strategy.

In one embodiment of the present invention, the method further comprises: determining an objective opening of the EGR valve based on the objective exhaust gas flow through the EGR valve; and determining an objective opening of the supercharge valve based on the objective exhaust gas flow through the supercharge valve.

In one embodiment of the present invention, the first drive signal is for controlling the opening of the EGR valve, and the second drive signal is for controlling the opening of the supercharge valve.

In one embodiment of the present invention, the non-linear physical model is correlated with the following aspects of the diesel engine: intake pressure, exhaust pressure, air flow, gas flow entering into cylinder, cylinder exhaust valve outlet flow, intake valve flow coefficient, rotary speed, cylinder displacement, intake thermal constant, intake temperature, intake pipe equivalent volume, exhaust thermal constant, exhaust temperature, exhaust pipe equivalent volume, supercharger mechanical efficiency of the EGR system, supercharger turbo efficiency, supercharger turbo thermal capacity, atmosphere ambient temperature, atmosphere ambient pressure, intake air thermal capacity ratio, exhaust gas thermal capacity ratio, compressor efficiency, moment of inertia of supercharger rotary shaft, supercharger rotary speed, supercharger turbo exhaust energy, supercharger compressed air energy, compressed air thermal capacity, and fuel ejection flow.

In one embodiment of the present invention, the non-linear physical model is further correlated with a dynamic interference source of the air system of the diesel engine.

According to another aspect of the present invention, there is provided a computer program medium comprising computer program code executed to perform the above described method.

According to one embodiment of the present invention, there is provided a novel and effective apparatus and method for controlling an air system (specifically, an EGR system and a turbocharge system). Specifically, by using a quasi-steady-state feature relation curve of a diesel engine equipped with an ERG system and a turbocharge system, a physical model characterizing the air system may be built, which may be used to effectively control the ERG system and the turbocharge system in various operation conditions (including transient and steady state), such that the air flow through an air compressor and the cylinder exhaust pipe pressure approach to desired objective values to the utmost.

In this way, while resisting the external interference source and unmodelled dynamic characteristic, the coupling between the ERG system and the turbocharge system may be considered. Besides, the apparatus according to the embodiments of the present invention not only has a simple structure but also is easily implemented. Therefore, the embodiments of the present invention may significantly improve the control of an air system of a diesel engine.

BRIEF DESCRIPTION OF SEVERAL VIEWS OF DRAWINGS

Through reading the following detailed description with reference to the accompanying drawings, the above mentioned and other objectives, features, and advantages of the embodiments of the present invention will become easily appreciated. In the drawings, several embodiments of the present invention will be illustrated in an exemplary and non-limiting manner, wherein.

In the drawings, same or corresponding reference signs indicate the same or corresponding parts.

DETAILED DESCRIPTION OF INVENTION

Hereinafter, the principle and spirit of the present invention will be described with reference to various exemplary embodiments. It should be understood that provision of these embodiments is only to allow those skilled in the art to better understand and further implement the present invention, instead of limiting the scope of the present invention in any manner.

According to one embodiment of the present invention, there is provided an apparatus and a method for controlling an air system of a diesel engine. It should be noted that the term "air system" used herein at least comprises an exhaust gas recirculation EGR system and a turbocharge system.

It should also be noted that specific turbocharge system such as a variable geometry turbocharge system (VGT) as mentioned herein are only for explanation and illustration purposes. The embodiments of the present invention are likewise suitable for any existing or future developed turbocharge system that works utilizing engine exhaust gas. The scope of the present invention is not limited in this aspect.

Additionally, the term "parameter" used herein represents any value that can indicate a physical quantity of the (objective or actual) physical state or operation condition of the engine. Moreover, in the context of this specification, a "parameter" may be used interchangeably with the physical quantity represented thereby. For example, "a parameter indicating rotary speed" has an equivalent meaning herein with "rotary speed." Besides, in this specification, suppose A represent a specific physical quantity, then $\dot{A}$ represent A taking a derivative with respect to time, i.e., change rate of A with respect to time.

Besides, in this specification, the term "acquire" includes various currently existing or future developed means such as measuring, reading, estimating, predicting, and the like.

Hereinafter, the principle and spirit of the present invention will be described in detail with reference to several representative embodiments of the present invention. First, referring to FIG. 1, as mentioned above, FIG. 1 shows a schematic structural diagram of a diesel engine 100 equipped with an exhaust gas recirculation system and a turbocharge system. It should be understood that FIG. 1 only shows those parts of the diesel engine 100 which are relevant to the embodiments of the present invention. The diesel engine 100 may further comprise any number of other components.

Figure 1:
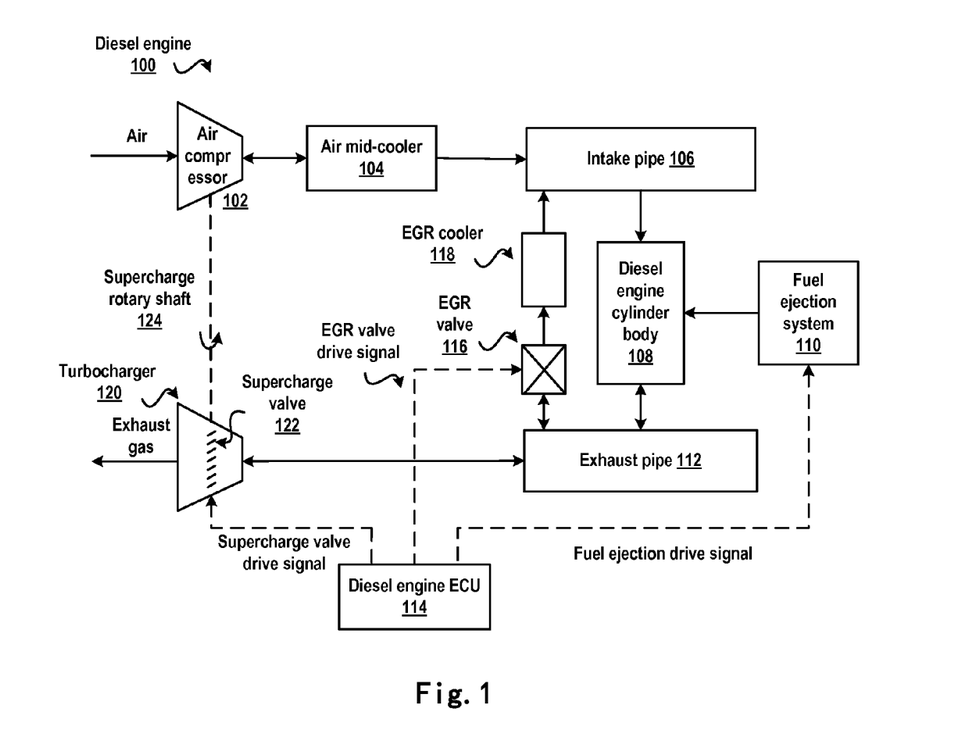
FIG. 1 shows a schematic structural diagram of a diesel engine comprising an exhaust gas recirculation system and a turbocharge system.

As shown in FIG. 1, the diesel engine 100 comprises: a cylinder 108; an intake pipe 106 coupled to an inlet end of the cylinder 108 and configured to convey gas to the cylinder 108; an exhaust pipe 112 coupled to an outlet end of the cylinder 108 and configured to emit exhaust gas from combustion in the cylinder 108; a fuel ejection system 110 coupled to the cylinder 108 and configured to eject fuel to the cylinder 108; an air system; and a control unit (ECU) 114 for controlling the diesel engine 100. As mentioned above, the air system comprises: an exhaust gas recirculation EGR system (e.g., comprising an ERG valve 116, an ERG cooler 118, and other essential components) coupled to the exhaust pipe 112 and the intake pipe 106, and configured to convey part of exhaust gas from the exhaust pipe 112 back to the cylinder 108 through the intake pipe 106; and a turbocharge system (e.g., comprising a supercharger 120, a supercharger rotary shaft 124, an air compressor 102, an air mid-cooler 104, and other essential components) coupled to the exhaust pipe 112, configured to supercharge intake pressure through the cylinder 108 using the exhaust gas from the exhaust pipe 112.

As seen in FIG. 1, both the exhaust gas recirculation system and the turbocharge system receive the exhaust gas from the exhaust pipe 112, and their intake flows are controlled by the EGR valve 116 and the supercharge valve 122, respectively. During the operation, the electronic control unit (ECU) 114 of the diesel engine generates corresponding EGR valve drive signal and supercharge valve drive signal based on operation condition of the engine, for controlling the opening of the EGR valve 116 and the supercharge valve 122, respectively. As mentioned above, the performances of the exhaust gas recirculation system and the turbocharge system are mutually influenced by each other; therefore, it is desirable to perform effective control for the opening of the exhaust gas recirculation valve 116 and of the supercharge valve 122.

According to the idea of the present invention, the key issue lies in how to precisely, flexibly, and effectively characterize the air system of the diesel engine, particularly how to characterize the mutual influence and effect between four key features, i.e., cylinder exhaust pressure, air flow through air compressor, exhaust gas flow through EGR valve, and exhaust gas flow through supercharge valve. If the above four features can be effectively characterized and modeled, effective control of the control system, which cannot be realized in prior art, would be realized. To this end, as elaborated infra, a non-linear physical model characterizing the above four key system features of the air system is built in the embodiments of the present invention and is used to control the air system of the diesel engine.

Figure 2:
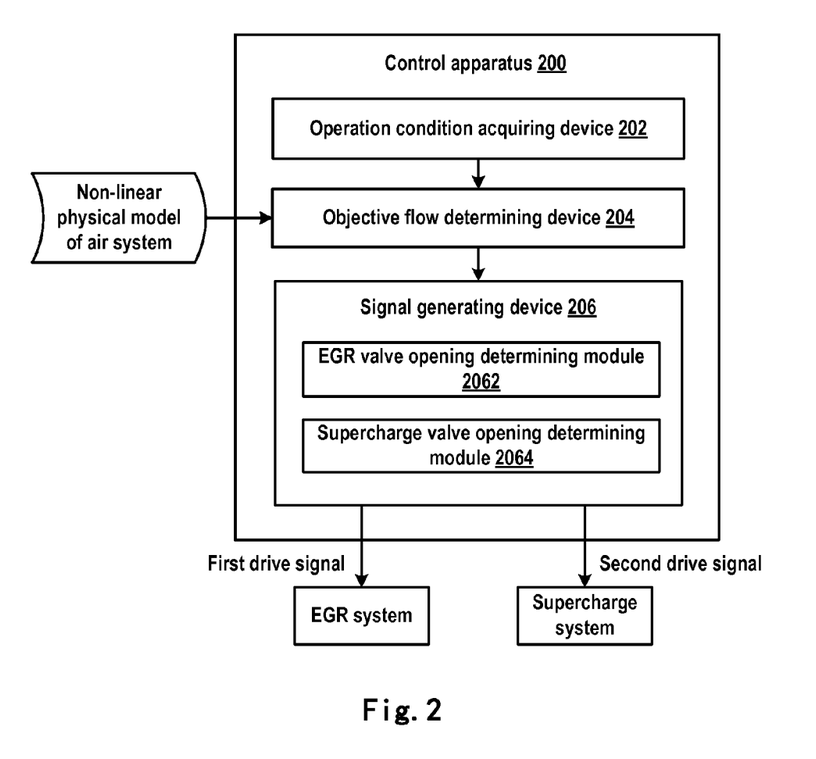
FIG. 2 shows a schematic structural diagram of a control apparatus 200 for controlling an air system of a diesel engine according to one embodiment of the present invention.

Referring to FIG. 2, shown is a schematic structural diagram of a control apparatus 200 for controlling an air system of a diesel engine according to one embodiment of the present invention. It should be understood that the control apparatus 200 may be implemented as the diesel engine ECU 114 as shown in FIG. 1 or a part thereof. Alternatively, the control apparatus 200 may also be implemented as a control device specific for an air system of a diesel engine.

As shown in FIG. 2, the control apparatus 200 comprises an operation condition acquiring device 202 configured to acquire measurement values (parameters) indicating an actual operation condition of a diesel engine (e.g., the diesel engine 100 shown in FIG. 1). Particularly, in some embodiments of the present invention, the operation condition acquiring device 202 may be configured to acquire a measurement value (denoted as $P_{em}$) of cylinder exhaust pressure of the diesel engine, and a measurement (denoted as $W_c$) of air flow through the air compressor included in the turbocharge system.

It should be understood that the operation condition acquiring device 202 may acquire a measurement value indicating the operation condition of the engine through actual measurement. Alternatively or additionally, the operation condition acquiring device 202 may also acquire a measurement value indicating the operation condition of the engine through estimation or prediction according to practical conditions. The scope of the present invention is not limited in this aspect.

As shown in FIG. 2, according to one embodiment of the present invention, the control apparatus 200 further comprises an objective flow determining device 204 coupled to the operation condition acquiring device 202 and configured to determine an objective exhaust gas flow ($W_{egr}$) though the EGR valve and an objective exhaust gas flow ($W_t$) through the supercharge valve based on an objective value ($P_{em,\ d}$) of the cylinder exhaust pressure of the diesel engine and an objective value ($W_{c,\ d}$) of the air flow through the air compressor, according to the $P_{em}$ and $W_c$ acquired by the operation condition acquiring device 202, using a non-linear physical model characterizing the air system.

It is seen that according to one embodiment of the present invention, the objective flow determining device 204 determines two key exhaust gas flows in the air system which are essential for satisfying $P_{em,\ d}$ and $W_{c,\ d}$, with $P_{em}$ and $W_c$ acquired by the operation condition acquiring device 202 as inputs, using a (multi-input/multi-output) non-linear physical model characterizing the air system. Actually, in this field, there has not yet been such an attempt to characterize and control an air system of a diesel engine through a control-oriented non-linear physical model in prior art. Below sets forth the detailed depiction of the air system control-oriented non-linear physical model according to the embodiments of the present invention.

According to one embodiment of the present invention, the non-linear physical model may be correlated with one or more aspects of the diesel engine. The "aspects" here include not only the inherent properties of the engine, but also real-time operation conditions during the running of the engine, e.g., including, but not limited to: intake pressure, exhaust pressure, air flow, gas flow entering into cylinders, cylinder exhaust valve outlet flow, intake valve flow coefficient, rotary speed, cylinder displacement, intake thermal constant, intake temperature, intake pipe equivalent volume, exhaust thermal constant, exhaust temperature, exhaust pipe equivalent volume, supercharger mechanical efficiency of the EGR system, supercharger turbo efficiency, supercharger turbo thermal capacity, atmosphere ambient temperature, atmosphere ambient pressure, intake air thermal capacity ratio, exhaust gas thermal capacity ratio, compressor efficiency, moment of inertia of supercharger rotary shaft, supercharger rotary speed, supercharger turbo exhaust energy, supercharger compressed air energy, compressed air thermal capacity, and fuel ejection flow. Besides, as depicted infra, in preferred embodiments, the physical model may also take dynamic interference factors that have not been modeled into consideration.

According to one embodiment of the present invention, an air-system-control-oriented non-linear physical model may be built by various means based on the above aspects of the engine. One preferred embodiment of the present invention will be depicted infra.

First, as known in the art, for a given diesel engine, the mass balance equation of the intake system can be expressed as:

$$\dot{P}_{im} = k_{im}(W_c + W_{egr} - W_{ei}) \quad (1)$$

Wherein $k_{im} = \dfrac{R_a T_{im}}{V_{im}}$, and wherein: $P_{im}$ denotes intake pressure of the engine cylinder; $R_a$ denotes intake thermal constant; $T_{im}$ indicates intake temperature; $V_{im}$ denotes intake pipe equivalent volume; $W_c$ denotes air flow through the air compressor of the turbocharge system; $W_{egr}$ denotes exhaust gas flow through the EGR valve; and $W_{ei}$ denotes the gas flow entering into the engine cylinder.

Besides, the mass balance equation of the exhaust system of the diesel engine can be expressed as:

$$\dot{P}_{em} = k_{em}(W_{eo} - W_t - W_{egr}) \quad (2)$$

Wherein:

$$k_{em} = \dfrac{R_e T_{em}}{V_{em}}$$

and wherein: $P_{em}$ denotes the exhaust pressure of the engine cylinder; $R_e$ denotes the exhaust thermal constant; $T_{em}$ denotes the exhaust temperature; $V_{em}$ denotes the exhaust pipe equivalent volume; $W_{eo}$ denotes the cylinder exhaust valve outlet flow; and $W_t$ denotes the exhaust gas flow through the supercharge valve; $W_{egr}$ denotes the exhaust gas flow through the EGR valve.

Besides, the supercharger moment of inertia balance equation of the turbocharge system of the diesel engine can be expressed as:

$$\dfrac{1}{2} J_t \dfrac{d}{dt}(\omega_t^2) = P_t \eta_m - P_c \quad (3)$$

wherein: $J_t$ denotes the supercharger rotary shaft moment of inertia; $\omega_t$ denotes the rotary speed of the supercharger; $P_t$ denotes the supercharger turbo exhaust energy; $\eta_m$ denotes the supercharger mechanical efficiency; $P_c$ denotes the supercharger compressed air energy.

Further, still as known in the art, the supercharger turbo exhaust energy $P_t$ can be expressed as:

$$P_t = W_t \eta_t C_{pe} T_{em} \left[ 1 - \left( \dfrac{P_{amb}}{P_{em}} \right)^{\frac{\gamma_e - 1}{\gamma_e}} \right] \quad (4)$$

wherein: $W_t$ denotes the exhaust flow through the supercharge valve, $\eta_t$ denotes the supercharger turbo efficiency; $C_{pe}$ denotes the supercharger turbo thermal capacity; $T_{em}$ denotes the exhaust temperature; $P_{amb}$ denotes the atmosphere ambient pressure; $P_{em}$ denotes the exhaust pressure of the engine cylinder; and $\gamma_e$ denotes the exhaust gas thermal capacity ratio.

Besides, because the supercharger mechanical efficiency and thermal efficiency, etc. cannot reach 100% in actual conditions, the actual supercharger compressed air energy can be expressed as:

$$P_c \eta_c = W_c c_{pa} T_{amb} \left[ \left( \dfrac{P_{im}}{P_{amb}} \right)^{\frac{\gamma_a - 1}{\gamma_a}} - 1 \right] \quad (5)$$

wherein: $P_c$ denotes the supercharger compressed air energy; $\eta_c$ denotes the comprehensive efficiency of the air compressor; $W_c$ denotes the air flow through the air compressor of the turbocharge system; $C_{pa}$ denotes the compressed air thermal capacity; $T_{amb}$ denotes the atmosphere ambient temperature; $P_{im}$ denotes the intake pressure of the engine cylinder; $P_{amb}$ denotes the atmosphere ambient pressure; and $\gamma_a$ notes the intake air thermal capacity ratio.

The above equations (1)-(5) depict aspects related to the air system of the diesel engine from different perspectives. However, prior art lacks effective means to characterize and utilize the coupling and mutual effect between these aspects. In order to solve this problem, a control-oriented non-linear physical model of the air system is built in the embodiments of the present invention.

Specifically, besides the above aspects, according to one embodiment of the present invention, the quasi steady-state feature curve of the turbocharger is also taken into consideration. The quasi steady-state feature curve of the turbocharger depicts the feature of the air flow of the compressor, and it can be predetermined through, e.g., a turbocharger manufacturer. Although this curve depicts the working feature of the supercharger in a quasi steady state, it likewise stands in a transient operation condition from a qualitative perspective.

It is seen from the quasi steady-state feature curve of the turbocharger that: The air flow through the compressor $W_c$ is a function of the engine cylinder intake pressure $P_{im}$ and the turbo rotary speed $\omega_t$, namely:

$$W_c = W_c(P_{im}, \omega_t) \quad (6)$$

It can be derived therefrom that:

$$\dot{W}_c = \dfrac{\partial W_c}{\partial P_{im}} \dot{P}_{im} + \dfrac{\partial W_c}{\partial \omega_t} \dot{\omega}_t + \Delta_c \quad (7)$$

For the sake of simplicity, in equation (6), suppose:

$$a_1 = \frac{\partial W_c}{\partial P_{im}}; a_2 = \frac{\partial W_c}{\partial \omega_t}$$

The two are functions of the engine cylinder intake pressure $P_{im}$ and the turbo rotary speed $\omega_t$. In particular, it may be seen that the equation (7) further comprises an item denoted as $\Delta_c$, which represents the dynamic interference source of the air system of the diesel engine, i.e., a dynamic feature that has not been modeled. According to one embodiment of the present invention, the $\Delta_c$ may be expressed as:

$$\Delta_c = \Delta_c(P_{im}, \omega_t, \dot{P}_{im}, \dot{\omega}_t) \tag{8}$$

Therefore, in this embodiment of the present invention, the non-linear physical model considers not only various inherent features of the engine, but also the impact from an external dynamic interference source, thereby it can realize a more robust control of the air system. Of course, it is only a preferred embodiment of the present invention. In an alternative embodiment, one embodiment of the present invention is likewise applicable in a case without considering the external dynamic interference source.

In particular, it would be appreciated by those skilled in the art that the dynamic feature $\Delta_c$ that has not been modeled apparently has a boundary, namely:

$$|\Delta_c| \leq \varepsilon \tag{9}$$

Wherein $\varepsilon$ is a constant.

Therefore, it can be derived based on equations (1)-(9) that $$\dot{W}_c = a_1 k_{im}\left(W_c + W_{egr} - \frac{\eta_e P_{im} \omega_e V_d}{120 R_a T_{im}}\right) + \frac{2a_2}{J_t \omega_t}\left(W_t \eta_m \eta_t c_{pe} T_{em}\left[1 - \left(\frac{P_{amb}}{P_{em}}\right)^{\frac{\gamma_e-1}{\gamma_e}}\right] - W_c c_{pa} T_{amb}\left[\left(\frac{P_{im}}{P_{amb}}\right)^{\frac{\gamma_a-1}{\gamma_a}} - 1\right]\right) + \Delta_c \tag{10}$$

Which can be organized as:

$$\dot{W}_c = a_3 + a_1 k_{im} W_{egr} + a_4 W_t + \Delta_c \tag{11}$$

Wherein:

$$a_3 = a_1 k_{im}\left(W_c - \frac{\eta_e P_{im} \omega_e V_d}{120 R_a T_{im}}\right) - \frac{2a_2 W_c c_{pa} T_{amb}}{J_t \omega_t}\left[\left(\frac{P_{im}}{P_{amb}}\right)^{\frac{\gamma_a-1}{\gamma_a}} - 1\right]$$

$$a_4 = \frac{2a_2 \eta_m \eta_t c_{pe} T_{em}}{J_t \omega_t}\left[1 - \left(\frac{P_{amb}}{P_{em}}\right)^{\frac{\gamma_e-1}{\gamma_e}}\right]$$

Which can be further organized as:

$$\dot{P}_{em} = a_5 - k_{em} W_{egr} - k_{em} W_t \tag{12}$$

Wherein $$a_5 = k_{em}\left(W_f + \frac{\eta_e P_{im} \omega_e V_d}{120 R_a T_{im}}\right) \tag{13}$$

Therefore, it can be derived that $$\begin{pmatrix} \dot{W}_c \\ \dot{P}_{em} \end{pmatrix} = \begin{pmatrix} a_3 \\ a_5 \end{pmatrix} + \begin{bmatrix} a_1 k_{im} & a_4 \\ -k_{em} & -k_{em} \end{bmatrix}\begin{pmatrix} W_{egr} \\ W_t \end{pmatrix} + \begin{pmatrix} \Delta_c \\ 0 \end{pmatrix} \tag{14}$$

For simplicity, the equation (14) can be further organized into the following form:

$$\dot{x} = f(x) + g(x)u + \Delta \tag{15}$$

wherein:

$$x = \begin{pmatrix} W_c \\ P_{em} \end{pmatrix};$$

$$f(x) = \begin{pmatrix} a_3 \\ a_5 \end{pmatrix};$$

$$g(x) = \begin{bmatrix} a_1 k_{im} & a_4 \\ -k_{em} & -k_{em} \end{bmatrix};$$

$$a_4 = \frac{2a_2 \eta_m \eta_t c_{pe} T_{em}}{J_t \omega_t}\left[1 - \left(\frac{P_{amb}}{P_{em}}\right)^{\frac{\gamma_e-1}{\gamma_e}}\right];$$

$$u = \begin{pmatrix} W_{egr} \\ W_t \end{pmatrix};$$

$$\Delta = \begin{pmatrix} \Delta_c \\ 0 \end{pmatrix}.$$

In this way, a multi-input/multi-output non-linear physical model characterizing relations between cylinder exhaust pressure, air flow through air compressor, exhaust flow through EGR valve, and exhaust flow through supercharge valve of a diesel engine is built in the embodiments of the present invention.

Of course, it should be understood that the above described is only a preferred embodiment of a control-oriented air system physical model. It is possible to have several variations of this model. For example, in some operation conditions, one or more aspects as mentioned above may not be considered in the physical model, and/or new aspects relevant to the engine may be added into the physical model. For another example, as mentioned above, in some embodiments, a dynamic interference source that has not been modeled may not be considered. Actually, based on the above inspiration and teaching as given by the present invention, those skilled in the art may design and implement any suitable physical model to characterize the air system of the diesel engine according to specific needs and conditions.

Besides, as mentioned above, among those aspects related in the physical model, some belong to inherent properties of the engine, while some are actual operation conditions of the engine. For the inherent properties of the engine, they may be determined and obtained in advance. However, for real-time operation conditions, they have to be acquired real-time during working process of the engine. Therefore, the operation condition acquiring device 202 may further comprise one or more (sub) device (not shown in FIG. 2), and each sub-device is configured to acquire a measurement value of a corresponding operation condition and convey it to the objective flow determining device 204 for use.

According to one embodiment of the present invention, based on the above physical model, with the actual measurement values $P_{em}$ and $W_c$ and the objective values $P_{em,d}$ and $W_{c,d}$ of the cylinder exhaust pressure and the air flow through the air compressor given, the objective flow determining device 204 may determine the objective exhaust gas flows through the EGR valve and the supercharge valve according to any currently known or future developed appropriate control strategies.

Hereinafter, taking a sliding control strategy as an example, one category of preferred embodiments of the present invention will be depicted in detail. Specifically, in this category of embodiments, the objective flow determining device 204 may further comprise a sliding-control-based determining module (not shown in FIG. 2) configured to determine the objective exhaust gas flows through the EGR valve and the supercharge valve based on the sliding control strategy. During the operation, the sliding-control-based determining module may be configured to define a sliding surface S=0, namely:

$$s = \tilde{x} = x - x_d$$

Wherein $$x_d = \begin{pmatrix} W_{c,d} \\ P_{em,d} \end{pmatrix}$$

At this point, based on the non-linear model of the air system as defined in equation (15), we have:

$$\frac{1}{2}\frac{d}{dt}(s^T s) = s^T \dot{s} = s^T(f(x) + g(x)u + \Delta) \quad (16)$$

Then, suppose the control law of the sliding control to be:

$$u = g^{-1}\left[-f(x) - \tilde{x} - \begin{pmatrix} \varepsilon \operatorname{sgn}(W_c - W_{c,d}) \\ 0 \end{pmatrix}\right] \quad (17)$$

Wherein sgn denotes a sign function, namely:

$$\operatorname{sgn}(y) = 1, \quad y > 0 \quad (18)$$
$$\operatorname{sgn}(y) = -1, \quad y < 0,$$

then $$\frac{1}{2}\frac{d}{dt}(s^T s) \leq -\lambda |s_1|$$

wherein $\lambda > 0$.
Thereby, it is derived that:

$$W_{egr} = \frac{1}{a_4 k_{em} - a_1 k_{im} k_{em}} \{-a_4(a_5 + P_{em} - P_{em,d}) - k_{em}[a_3 + (W_c - W_{c,d}) + \varepsilon \operatorname{sgn}(W_c - W_{c,d})]\} \quad (19)$$

And $$W_t = \frac{1}{a_4 k_{em} - a_1 k_{im} k_{em}} \{k_{em}[a_3 + (W_c - W_{c,d}) + \varepsilon \operatorname{sgn}(W_c - W_{c,d})] + a_1 k_{im}(a_5 + P_{em} - P_{em,d})\} \quad (20)$$

In this way, the objective flow determining device 204 can determine the objective exhaust gas flows through the EGR valve and the supercharge valve.

It should be understood that the above embodiment based on a sliding control strategy is only exemplary. In the case that the control-oriented non-linear physical model of an air system has been built, the objective flow determining device 204 may comprise any appropriate sub-device configured to determine the objective exhaust gas flows through the EGR valve and the supercharge valve by any appropriate control strategy, e.g., a robust self-adaptive control strategy, a robust non-linear control strategy, etc. The scope of the present invention is not limited in this aspect.

Continue referring to FIG. 2, the control apparatus 200 may further comprise a signal generating device 206 coupled to the objective flow determining device 204 and configured to generate a first drive signal for the EGR system and a second drive signal for the turbocharge system based on the objective exhaust gas flow through the EGR valve and the objective exhaust gas flow through the supercharge valve as determined by the objective flow determining device 204.

In particular, according to one embodiment of the present invention, the first drive signal is for controlling the opening of the EGR valve, and the second drive signal is for controlling the opening of the supercharge valve. To this end, according to one embodiment of the present invention, the signal generating device 206 may further comprise an EGR valve opening determining module 2062 and a supercharge valve opening determining module 2064 both configured to determine an objective opening of the ERG valve and an objective opening of the supercharge valve respectively based on the data from the objective flow determining device 204.

As known to those skilled in the art, determinable corresponding relations exist between the exhaust gas flows through the two valves and the openings of the two valves, respectively. For example, in some embodiments of the present invention, the corresponding relations between the two are acquired based on a corresponding pulse tracing graph. In other words, after receiving the objective exhaust gas flow through the EGR valve from the objective flow determining device 204, the EGR valve opening determining module 2062 determines the objective opening of the EGR valve based on the pulse tracing graph relation between the exhaust gas flow through the EGR valve and the opening of the EGR valve. Likewise, the supercharge valve opening determining module 2064 may also determine the objective opening of the supercharge valve based on the pulse tracing graph. Correspondingly, the signal generating device 206 will generate control signals to drive the openings of the EGR valve and the supercharge valve.

The structure and operation of the control apparatus 200 according to the present invention have been depicted with reference to several preferred embodiments. It should be understood through the above depiction that according to the embodiments of the present invention, the control apparatus 200 may effectively realize the control of the EGR system and the turbocharge system by adopting the non-linear physical model of the air system, such that the actual operation condition of the air system approaches to the desired operation condition to the utmost.

It should be understood that the control apparatus 200 as illustrated in FIG. 2 and depicted above may be implemented in various manners. For example, in some embodiments, the apparatus 200 may be implemented as an integrated circuit (IC) chip. In other embodiments, the apparatus 200 may be implemented through a system on chip (SoC) and corresponding software and/or firmware. Alternatively or additionally, the apparatus 200 may also be implemented using software module, i.e., implemented as a computer program product. The scope of the present invention is not limited in this aspect.

Figure 3:
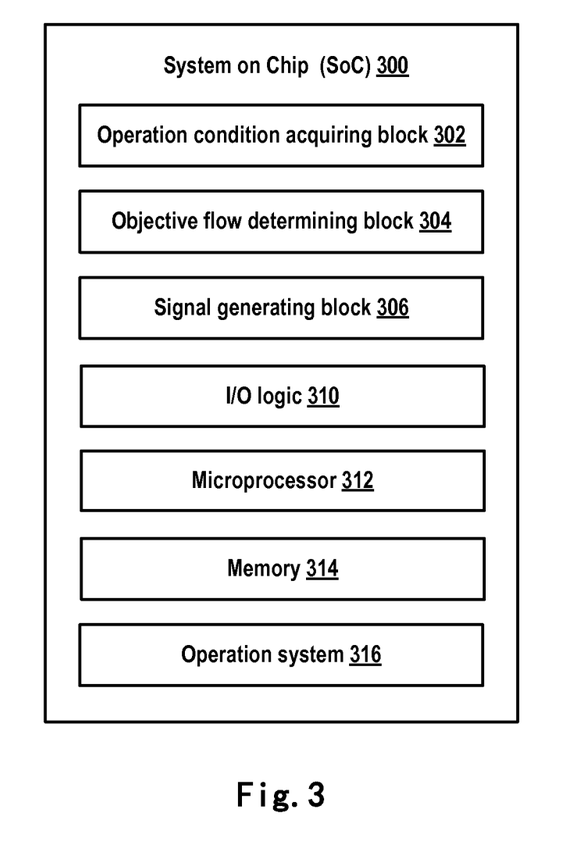
FIG. 3 shows a schematic structural diagram of a system-on-chip (SoC) 300 suitable for implementing the control apparatus 200 in FIG. 2.

Referring to FIG. 3, illustrated is a structural block diagram of a system on chip (SoC) 300 suitable for implementing the control apparatus 200 as shown in FIG. 2. As shown in FIG. 3, the SoC 300 may comprise an operation condition acquiring block 302, an objective flow determining block 304, and a signal generating block 306, which correspond to the operation condition acquiring device 202, the objective flow determining device 204, and the signal generating device 206 as depicted above with reference to FIG. 2, respectively. Besides, although not shown in FIG. 3, according to the embodiments of the present invention, those blocks may further comprise sub-blocks, corresponding to the sub-devices included in respective devices as depicted in FIG. 2. Those blocks 302-306 and their sub-blocks may operate as modules of hardware, software, and/or firmware, independently or integrated with other entities such as a signal processing and control circuit, for implementing various embodiments and/or features as depicted herein.

Besides, the SoC 300 comprises various components, such as an input/output (I/O) logic 310 (e.g. for including an electronic circuit) and a microprocessor 312 (e.g., any microcontroller or digital signal processor). The SoC 300 further comprises a memory 314, which may be any type of random access memory (RAM), a low delay non-volatile memory (e.g., flash memory), a read-only memory (ROM) and/or any other appropriate electronic data storage. The SoC 300 may further comprise various kinds of firmware and/or software, such as an operation system 316, which may be computer executable instructions maintained by the memory 314 and executed by the microprocessor 312. The SoC 300 may further comprise various kinds of other communication interfaces and components, network interface components, other hardware, firmware, and/or software.

It should be understood that according to the embodiments of the present invention, the SoC 300 may be integrated with an electronic circuit, a microprocessor, a memory, an input/output (I/O) logic, a communication interface and component, other hardware, firmware, and/or software which are essential for running the whole apparatus. The SoC 300 may further comprise an integrated data bus (not shown) coupled to various components of the SoC so as to be used for data communication between components. The apparatus including SoC 300 may be implemented using multiple combinations of different components.

Figure 4:
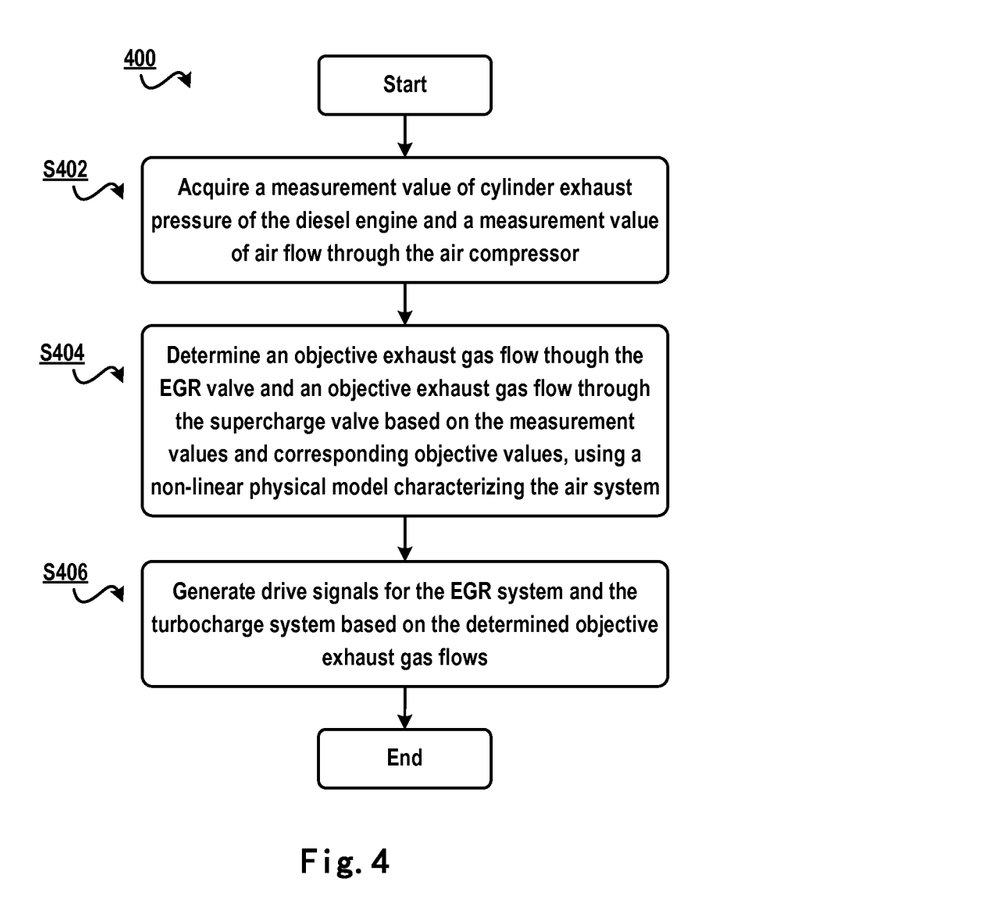
FIG. 4 shows a flow chart of a control method 400 for an air system of a diesel engine according to one embodiment of the present invention.

Referring to FIG. 4, shown is a flow chart of a method 400 for controlling an air system of a diesel engine according to the embodiments of the present invention. After start of method 400, a measurement value of cylinder exhaust pressure and a measurement value of air flow through an air compressor are obtained at step S402.

Next, at step S404, an objective exhaust gas flow though the EGR valve and an objective exhaust gas flow through the supercharge valve are determined based on the cylinder exhaust pressure and the measurement value of the air flow through the air compressor as well as their corresponding objective values, using a non-linear physical model characterizing the air system. As mentioned above, according to the embodiments of the present invention, various kinds of control strategies, e.g., sliding control, adaptive control, non-linear control, and the like may be utilized to determine the objective exhaust gas flow through the EGR valve and the objective exhaust gas flow through the supercharge valve.

Then, at step S406, drive signals for the EGR system and the turbocharge system are generated based on the objective exhaust gas flow through the EGR valve and the objective exhaust gas flow through the supercharge valve. For example, in some embodiments, the objective openings of the EGR valve and the supercharge valve may be determined based on the two objective exhaust gas flows, respectively, (e.g., based on pulse tracing graph), and the drive signals may correspondingly drive the EGR valve and the supercharge valve, respectively.

It would be appreciated that the above steps as depicted in method 400 exactly correspond to the devices in the apparatus 200 as depicted with reference to FIG. 2, respectively. Therefore, the operations, functions, and/or features as depicted above with reference to respective devices of the control apparatus 200 are likewise suitable for the respective steps of the method 400. Moreover, respective steps as recited in method 400 may be implemented in different orders and/or in parallel.

Further, it should be understood that the method 400 as described with reference to FIG. 4 may be implemented via a computer program product. For example, the computer program product may comprise at least one computer-readable memory medium that has computer-readable program code portion stored thereon. When it is executed by e.g. a processor, the computer-readable code portion is used to execute the steps of the method 400.

The spirit and principle of the present invention has been illustrated above with reference to a plurality of preferred embodiments. According to the embodiments of the present invention, a physical model that characterizes the air system of the diesel engine may be built, which may be used to effectively control the EGR system and the turbocharge system under various operation conditions (including transient and steady state), such that the air flow through the air compressor and the cylinder exhaust pipe pressure can approach the desired objective values to the utmost. In this way, the coupling between the ERG system and the turbocharge system may be considered while the external interference source and dynamic features having not been modeled may also be resisted. Besides, the apparatus according to the embodiments of the present invention not only has a simple structure but also is easily implemented. Therefore, the embodiments of the present invention may significantly improve the control of the air system of a diesel engine.

It should be noted that, the embodiments of the present invention can be implemented via software, hardware, or the combination thereof. The hardware part can be implemented by a special logic. The software part can be stored in a memory and executed by a proper instruction execution system such as a microprocessor or a design-specific hardware. The ordinary skilled in the art may understand that the above apparatus and method may be implemented using computer-executable instruction and/or included in processor controlled code, e.g., such code being provided on a carrier medium such as a magnetic disk, CD, or DVD-ROM, or a programmable memory such as a read-only memory (firmware) or a data carrier such as an optical or electronic signal carrier. The apparatuses and their components in the present invention may be implemented as hardware circuitry of a programmable hardware device such as a very large scale integrated circuit or gate array, a semiconductor such as logical chip or transistor, or a programmable hardware device such as a field-programmable gate array, etc., or implemented as software executed by various kinds of processors, or as a combination of the above described hardware circuitry and software, such as firmware.

It should be noted that although several devices or sub-device of the control apparatus have been mentioned in the above detailed depiction, such partitioning is only non-compulsory. In fact, according to the embodiments of the present invention, the features and functions of two or more means described above may be embodied in one means, whereas, the features and functions of one means described above may be further embodied in more means.

Besides, although operations of the present methods are described in a particular order in the drawings, it does not require or imply that these operations must be performed according to this particular sequence, or a desired outcome can only be achieved by performing all operations shown. On the contrary, the execution order for the steps as depicted in the flowcharts may be varied. Additionally or alternatively, some steps may be omitted, a plurality of steps may be merged into one step, and/or a step may be divided into a plurality of steps for execution.

Although the present invention has been depicted with reference to a plurality of embodiments, it should be understood that the present invention is not limited to the disclosed embodiments. The present invention intends to cover various modifications and equivalent arrangements included in the spirit and scope of the appended claims. The scope of the appended claims meets the broadest explanations and covers all such modifications and equivalent structures and functions.

What is claimed is:

1. An apparatus for controlling an air system of a diesel engine, the air system comprising an exhaust gas recirculation EGR system and a turbocharge system, wherein the EGR system comprises an EGR valve, and the turbocharge system comprises an air compressor and a supercharge valve, the apparatus comprising:
   an operation condition acquiring device configured to acquire a measurement value of cylinder exhaust pressure of the diesel engine and a measurement value of air flow through the air compressor;
   an objective flow determining device coupled to the operation condition acquiring device and configured to determine an objective exhaust gas flow though the EGR valve and an objective exhaust gas flow through the supercharge valve based on an objective value of the cylinder exhaust pressure of the diesel engine and an objective value of the air flow through the air compressor, and according to the measurement values acquired by the operation condition acquiring device, using a non-linear physical model characterizing the air system; and
   a signal generating device coupled to the objective flow determining device and configured to generate a first drive signal for the EGR system and a second drive signal for the turbocharge system based on the objective exhaust gas flow through the EGR valve and the objective exhaust gas flow through the supercharge valve as determined by the objective flow determining device.

2. The apparatus according to claim 1, wherein the objective flow determining device further comprises:
   a sliding-control-based determining module configured to determine the objective exhaust gas flow through the EGR valve and the objective exhaust gas flow through the supercharge valve based on a sliding control strategy.

3. The apparatus according to claim 1, wherein the signal generating device further comprises:
   an EGR valve objective opening determining module configured to determine an objective opening of the EGR valve based on the objective exhaust gas flow through the EGR valve; and
   a supercharge valve objective opening determining module configured to determine an objective opening of the supercharge valve based on the objective exhaust gas flow through the supercharge valve.

4. The apparatus according to claim 3, wherein the first drive signal is for controlling the opening of the EGR valve, and wherein the second drive signal is for controlling the opening of the supercharge valve.

5. The apparatus according to claim 1, wherein the apparatus is implemented using a system-on-chip SoC or an integrated circuit IC.

6. The apparatus according to claim 1, wherein the non-linear physical model is correlated with the following aspects of the diesel engine:
   intake pressure, exhaust pressure, air flow, gas flow entering into cylinders, cylinder exhaust valve outlet flow, intake valve flow coefficient, rotary speed, cylinder displacement, intake thermal constant, intake temperature, intake pipe equivalent volume, exhaust thermal constant, exhaust temperature, exhaust pipe equivalent volume, supercharger mechanical efficiency of the EGR system, supercharger turbo efficiency, supercharger turbo thermal capacity, atmosphere ambient temperature, atmosphere ambient pressure, intake air thermal capacity ratio, exhaust gas thermal capacity ratio, compressor efficiency, moment of inertia of supercharger rotary shaft, supercharger rotary speed, supercharger turbo exhaust energy, supercharger compressed air energy, compressed air thermal capacity, and fuel ejection flow.

7. The apparatus according to claim 6, wherein the non-linear physical model is further correlated with a dynamic interference source of the air system of the diesel engine.

8. A diesel engine, comprising:
   a cylinder;
   an intake pipe coupled to an inlet end of the cylinder and configured to convey gas to the cylinder;
   an exhaust pipe coupled to an outlet end of the cylinder and configured to exhaust gas from combustion in the cylinder;
   a fuel ejection system coupled to the cylinder and configured to eject fuel to the cylinder;
   an air system, comprising:
      an exhaust gas recirculation EGR system coupled to the exhaust pipe and the intake pipe and comprising the EGR valve, the EGR system being configured to convey part of exhaust gas from the exhaust pipe back to the cylinder through the intake pipe;
      a turbocharge system coupled to the exhaust pipe and comprising an air compressor and a supercharge valve, the turbocharge system being configured to supercharge intake pressure through the cylinder using the exhaust gas from the exhaust pipe; and
   a control unit comprising the apparatus of claim 1 for controlling the air system.

9. A method for controlling an air system of a diesel engine, the air system comprising an exhaust gas recirculation EGR system and a turbocharge system, wherein the EGR system comprises an EGR valve, and the turbocharge system comprises an air compressor and a supercharge valve, the method comprising:
    acquiring a measurement value of cylinder exhaust pressure of the diesel engine and a measurement value of air flow through the air compressor;
    determining an objective exhaust gas flow through the EGR valve and an objective exhaust gas flow through the supercharge valve based on an objective value of the cylinder exhaust pressure of the diesel engine and an objective value of the air flow through the air compressor, and according to the acquired measurement values, using a non-linear physical model characterizing the air system; and
    generating a first drive signal for the EGR system and a second drive signal for the turbocharge system based on the objective exhaust gas flow through the EGR valve and the objective exhaust gas flow through the supercharge valve.

10. The method according to claim 9, wherein the determining further comprises: determining the objective exhaust gas flow through the EGR valve and the objective exhaust gas flow through the supercharge valve based on a sliding control strategy.

11. The method according to claim 9, further comprising:
    determining an objective opening of the EGR valve based on the objective exhaust gas flow through the EGR valve; and
    determining an objective opening of the supercharge valve based on the objective exhaust gas flow through the supercharge valve.

12. The method according to claim 11, wherein the first drive signal is for controlling the opening of the EGR valve, and wherein the second drive signal is for controlling the opening of the supercharge valve.

13. The method according to claim 9, wherein the non-linear physical model is correlated with the following aspects of the diesel engine:
    intake pressure, exhaust pressure, air flow, gas flow entering into cylinders, cylinder exhaust valve outlet flow, intake valve flow coefficient, rotary speed, cylinder displacement, intake thermal constant, intake temperature, intake pipe equivalent volume, exhaust thermal constant, exhaust temperature, exhaust pipe equivalent volume, supercharger mechanical efficiency of the EGR system, supercharger turbo efficiency, supercharger turbo thermal capacity, atmosphere ambient temperature, atmosphere ambient pressure, intake air thermal capacity ratio, exhaust gas thermal capacity ratio, compressor efficiency, moment of inertia of supercharger rotary shaft, supercharger rotary speed, supercharger turbo exhaust energy, supercharger compressed air energy, compressed air thermal capacity, and fuel ejection flow.

14. The method according to claim 13, wherein the non-linear physical model is further correlated with a dynamic interference source of the air system of the diesel engine.

15. A computer program medium, comprising computer program code executed to implement the method according to claim 9.

16. The computer program medium of claim 15, wherein the determining further comprises: determining the objective exhaust gas flow through the EGR valve and the objective exhaust gas flow through the supercharge valve based on a sliding control strategy.

17. The computer program medium of claim 15, wherein the method further comprises:
    determining an objective opening of the EGR valve based on the objective exhaust gas flow through the EGR valve; and
    determining an objective opening of the supercharge valve based on the objective exhaust gas flow through the supercharge valve.

18. The computer program medium of claim 17, wherein the first drive signal is for controlling the opening of the EGR valve, and wherein the second drive signal is for controlling the opening of the supercharge valve.

19. The computer program medium of claim 15, wherein the non-linear physical model is correlated with the following aspects of the diesel engine:
    intake pressure, exhaust pressure, air flow, gas flow entering into cylinders, cylinder exhaust valve outlet flow, intake valve flow coefficient, rotary speed, cylinder displacement, intake thermal constant, intake temperature, intake pipe equivalent volume, exhaust thermal constant, exhaust temperature, exhaust pipe equivalent volume, supercharger mechanical efficiency of the EGR system, supercharger turbo efficiency, supercharger turbo thermal capacity, atmosphere ambient temperature, atmosphere ambient pressure, intake air thermal capacity ratio, exhaust gas thermal capacity ratio, compressor efficiency, moment of inertia of supercharger rotary shaft, supercharger rotary speed, supercharger turbo exhaust energy, supercharger compressed air energy, compressed air thermal capacity, and fuel ejection flow.

20. The computer program medium of claim 15, wherein the non-linear physical model is further correlated with a dynamic interference source of the air system of the diesel engine.

\* \* \* \* \*